United States Patent
Sartori et al.

(10) Patent No.: US 11,678,260 B2
(45) Date of Patent: Jun. 13, 2023

(54) SYSTEM AND METHOD FOR TIME-POWER-FREQUENCY HOPPING FOR D2D DISCOVERY

(71) Applicant: Futurewei Technologies, Inc., Plano, TX (US)

(72) Inventors: Philippe Sartori, Plainfield, IL (US); Vipul Desai, Palatine, IL (US); Hossein Bagheri, Urbana, IL (US); Anthony C. K. Soong, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/863,859

(22) Filed: Apr. 30, 2020

(65) Prior Publication Data
US 2020/0260369 A1 Aug. 13, 2020

Related U.S. Application Data

(63) Continuation of application No. 15/612,513, filed on Jun. 2, 2017, now Pat. No. 10,645,638, which is a
(Continued)

(51) Int. Cl.
*H04W 48/16* (2009.01)
*H04W 8/00* (2009.01)
(Continued)

(52) U.S. Cl.
CPC .......... *H04W 48/16* (2013.01); *H04B 1/7143* (2013.01); *H04W 8/005* (2013.01); *H04W 72/0453* (2013.01)

(58) Field of Classification Search
CPC . H04W 48/16; H04W 72/0453; H04W 8/005; H04B 1/7143
See application file for complete search history.

(56) References Cited

U.S. PATENT DOCUMENTS 8,428,079 B1 * 4/2013 Lambert .......... H04W 52/0216
370/461
8,792,341 B2 7/2014 Ahmed et al.
(Continued)

FOREIGN PATENT DOCUMENTS

CN 102625252 A 8/2012
CN 102970758 3/2013
(Continued)

OTHER PUBLICATIONS

3rd Generation Partnership Project; Technical Specification Group Radio Access Network; Evolved Universal Terrestrial Radio Access (E-UTRA); Physical Channels and Modulation (Release 11), 3GPP TS 36.211 v11.3.0, Jun. 2013, 108 pages.
(Continued)

*Primary Examiner* — Parth Patel
(74) *Attorney, Agent, or Firm* — Slater Matsil, LLP

(57) ABSTRACT

A system and method for D2D discovery is provided. In an embodiment the method includes sending, by a base station, first parameters to a first User Equipment (UE) indicating a set of discovery resources in a discovery cycle, wherein the discovery cycle comprises a plurality of subframes; and sending, by the base station, second parameters to the first UE indicating a first probability for transmitting a first discovery signal to a second UE on a subframe of the plurality of subframes so that the first UE is capable of transmitting the first discovery signal to a second UE in the discovery cycle according to the first parameters when a random number between 0 and 1, selected by the first UE, is equal or larger than the first probability.

20 Claims, 3 Drawing Sheets

Related U.S. Application Data continuation of application No. 14/207,197, filed on Mar. 12, 2014, now Pat. No. 9,706,481.

(60) Provisional application No. 61/822,129, filed on May 10, 2013, provisional application No. 61/798,381, filed on Mar. 15, 2013.

(51) Int. Cl.
*H04B 1/7143* (2011.01)
*H04W 72/0453* (2023.01)

(56) References Cited

U.S. PATENT DOCUMENTS

| | | | | |
|---|---|---|---|---|
| 8,855,190 | B2 | 10/2014 | Tian et al. | |
| 9,084,283 | B2* | 7/2015 | Palanki | H04W 88/04 |
| 9,350,991 | B2 | 5/2016 | Tian et al. | |
| 9,420,491 | B2* | 8/2016 | Bacquet | H04W 72/0453 |
| 9,462,567 | B2 | 10/2016 | Johnsson et al. | |
| 9,706,481 | B2 | 7/2017 | Sartori et al. | |
| 9,973,916 | B2 | 5/2018 | Niu et al. | |
| 2004/0063465 | A1* | 4/2004 | Uhlik | H04W 68/00 |
| | | | | 455/561 |
| 2008/0232240 | A1* | 9/2008 | Baum | H04W 88/00 |
| | | | | 370/210 |
| 2009/0252244 | A1* | 10/2009 | Sugaya | H04W 8/005 |
| | | | | 375/260 |
| 2009/0325482 | A1* | 12/2009 | Zhou | H04B 7/2606 |
| | | | | 455/25 |
| 2010/0067613 | A1* | 3/2010 | Park | H04J 11/00 |
| | | | | 375/295 |
| 2010/0172647 | A1* | 7/2010 | Luo | H04J 3/0605 |
| | | | | 398/66 |
| 2010/0271993 | A1 | 10/2010 | Byard et al. | |
| 2010/0296493 | A1* | 11/2010 | Lee | H04B 1/7143 |
| | | | | 370/336 |
| 2010/0317291 | A1* | 12/2010 | Richardson | H04W 74/0825 |
| | | | | 455/63.1 |
| 2011/0066738 | A1* | 3/2011 | Richardson | H04W 72/02 |
| | | | | 709/229 |
| 2011/0268101 | A1* | 11/2011 | Wang | H04W 4/02 |
| | | | | 370/344 |
| 2011/0275382 | A1* | 11/2011 | Hakola | H04W 52/386 |
| | | | | 455/452.2 |
| 2012/0045989 | A1 | 2/2012 | Suumaki et al. | |
| 2012/0218992 | A1* | 8/2012 | Effenberger | H04L 25/03866 |
| | | | | 370/389 |
| 2013/0114526 | A1* | 5/2013 | Ahn | H04W 40/246 |
| | | | | 370/329 |
| 2013/0122893 | A1* | 5/2013 | Turtinen | H04W 8/005 |
| | | | | 455/423 |
| 2013/0156003 | A1* | 6/2013 | Liang | H04L 1/1671 |
| | | | | 370/330 |
| 2013/0223398 | A1* | 8/2013 | Li | H04W 72/085 |
| | | | | 370/329 |
| 2013/0235754 | A1* | 9/2013 | Lim | H04W 72/042 |
| | | | | 370/252 |
| 2013/0286882 | A1* | 10/2013 | Lim | H04W 52/0219 |
| | | | | 370/252 |
| 2013/0288608 | A1* | 10/2013 | Fwu | H04W 72/02 |
| | | | | 455/63.1 |
| 2013/0310086 | A1* | 11/2013 | Hu | H04W 68/02 |
| | | | | 455/458 |
| 2013/0322413 | A1* | 12/2013 | Pelletier | H04L 5/0091 |
| | | | | 370/336 |
| 2014/0022986 | A1* | 1/2014 | Wu | H04W 48/16 |
| | | | | 370/328 |
| 2014/0056165 | A1* | 2/2014 | Siomina | H04J 11/0086 |
| | | | | 370/252 |
| 2014/0064203 | A1* | 3/2014 | Seo | H04L 1/1854 |
| | | | | 370/329 |
| 2014/0073369 | A1* | 3/2014 | Senarath | H04W 72/0446 |
| | | | | 455/509 |
| 2014/0094183 | A1 | 4/2014 | Gao et al. | |
| 2014/0120934 | A1* | 5/2014 | Kishiyama | H04W 56/001 |
| | | | | 455/452.1 |
| 2014/0126403 | A1* | 5/2014 | Siomina | H04J 11/005 |
| | | | | 370/252 |
| 2014/0192735 | A1* | 7/2014 | Sridharan | H04L 61/2038 |
| | | | | 370/329 |
| 2014/0198655 | A1* | 7/2014 | Ishii | H04W 76/14 |
| | | | | 370/235 |
| 2014/0198783 | A1 | 7/2014 | Qi et al. | |
| 2014/0204847 | A1* | 7/2014 | Belleschi | H04W 76/14 |
| | | | | 370/329 |
| 2014/0204898 | A1* | 7/2014 | Yang | H04W 52/0216 |
| | | | | 370/330 |
| 2014/0219095 | A1 | 8/2014 | Lim et al. | |
| 2014/0242963 | A1* | 8/2014 | Novlan | H04W 48/16 |
| | | | | 455/418 |
| 2014/0269494 | A1* | 9/2014 | Zhu | H04W 40/246 |
| | | | | 370/328 |
| 2014/0269558 | A1* | 9/2014 | Sartori | H04W 48/16 |
| | | | | 370/329 |
| 2014/0307642 | A1* | 10/2014 | Wanstedt | H04L 5/0094 |
| | | | | 370/329 |
| 2015/0023267 | A1 | 1/2015 | Lim et al. | |
| 2015/0094057 | A1* | 4/2015 | Lu | H04W 16/30 |
| | | | | 455/434 |
| 2015/0131571 | A1* | 5/2015 | Fodor | H04W 72/04 |
| | | | | 370/329 |
| 2015/0156619 | A1* | 6/2015 | Fodor | H04W 8/005 |
| | | | | 455/434 |
| 2015/0156620 | A1 | 6/2015 | Morita | |
| 2015/0208367 | A1* | 7/2015 | Khude | H04W 72/02 |
| | | | | 370/312 |
| 2015/0365941 | A1 | 12/2015 | Liu et al. | |
| 2017/0019882 | A1* | 1/2017 | Nimbalker | H04W 74/02 |
| 2017/0063595 | A1* | 3/2017 | Ma | H04L 29/08 |
| 2017/0280482 | A1* | 9/2017 | Chatterjee | H04W 74/0833 |

FOREIGN PATENT DOCUMENTS

| | | |
|---|---|---|
| WO | 2011138495 | 11/2011 |
| WO | 2012093783 | 7/2012 |
| WO | 2013028044 | 2/2013 |

OTHER PUBLICATIONS

International Search Report received in PCT/CN2014/073497, dated Jun. 30, 2014, 12 pages.

* cited by examiner

SYSTEM AND METHOD FOR TIME-POWER-FREQUENCY HOPPING FOR D2D DISCOVERY

CROSS-REFERENCE TO RELATED APPLICATIONS

This application is a continuation of U.S. patent application Ser. No. 15/612,513 filed Jun. 2, 2017 and entitled "System and Method for Time-Power Frequency Hopping for D2D Discovery", which is a continuation of U.S. patent application Ser. No. 14/207,197 filed Mar. 12, 2014 (Now U.S. Pat. No. 9,706,481, issued on Jul. 11, 2017) and entitled "System and Method for Time-Power Frequency Hopping for D2D Discovery", which claims the benefit of U.S. Provisional Application No. 61/822,129 filed on May 10, 2013 by Hossein Bagheri et al. and entitled "System and Method for Time-Power-Frequency Hopping for D2D Discovery," and U.S. Provisional Application No. 61/798,381 filed on Mar. 15, 2013 by Philippe Sartori et al. and entitled "Time-Power-Frequency Hopping for D2D Discovery," which are hereby incorporated herein by reference as if reproduced in their entirety.

TECHNICAL FIELD

The present invention relates to the field of wireless network communications, and, in particular embodiments, to a system and method for time-power-frequency hopping for device-to-device (D2D) discovery.

BACKGROUND

Device-to-Device (D2D) technology is getting attraction because of the ability to offer new services, improve system throughput, and offer a better user experience. One aspect of D2D technology that appears promising is D2D proximity discovery. With D2D proximity discovery, user equipments (UEs) attempt to discover neighboring UEs or other entities. This information can be used for better social networking (e.g., in Social, Local, Mobile environment, also referred to as SOLOMO), personalized advertising, and other applications. However, in order for D2D discovery to be successful and applicable to various deployment scenarios, there is a need to ensure that D2D discovery works in a network with a large number of UEs, with possibly different power levels and distances.

SUMMARY OF THE INVENTION

In accordance with an embodiment, a method implemented by a method by a network component for assigning resources for a device-to-device (D2D) discovery signal includes transmitting, to a user equipment (UE), parameters indicating a set of discovery resources. The set of discovery resources comprises a first sequence of resources and a second sequence of resources. The method further includes transmitting, to the UE, second parameters indicating a hopping pattern of the first sequence of resources for transmitting a discovery signal by the UE and of the second sequence of resources for receiving a second discovery signal by the UE. The first sequence of resources comprises at least one of a sequence of time instances and a sequence of power levels. The second sequence of resources comprises time instances.

In accordance with another embodiment, a method implemented by a network component configured for assigning resources for a D2D discovery signal comprises at least one processor and a transitory computer readable storage medium storing programming for execution by the at least one processor. The programming includes instructions to transmit, to a UE, parameters indicating a set of discovery resources. The set of discovery resources comprises a first sequence of resources and a second sequence of resources. The programming includes further instructions to transmit, to the UE, second parameters indicating a hopping pattern of the first sequence of resources for transmitting a discovery signal by the UE and of the second sequence of resources for receiving a second discovery signal by the UE. The first sequence of resources comprises at least one of a sequence of time instances and a sequence of power levels. The second sequence of resources comprises time instances.

In accordance with another embodiment, a method by a UE for supporting hopping for D2D discovery includes receiving, from a network, parameters indicating a set of discovery resources. The set of discovery resources comprises a first sequence of resources and a second sequence of resources. The method further includes receiving, from the network, second parameters indicating a hopping pattern of the first sequence of resources for transmitting a discovery signal by the UE and of the second sequence of resources for receiving a second discovery signal by the UE. The first sequence of resources comprises at least one of a sequence of time instances and a sequence of power levels. The second sequence of resources comprises time instances.

In accordance with yet another embodiment, a user device configured for supporting time, power, and frequency hopping for D2D discovery comprises at least one processor and a computer readable storage medium storing programming for execution by the at least one processor. The programming includes instructions to receive, from a network, parameters indicating a set of discovery resources. The set of discovery resources comprises a first sequence of resources and a second sequence of resources. The programming includes further instructions to receive, from the network, second parameters indicating a hopping pattern of the first sequence of resources for transmitting a discovery signal by the UE and of the second sequence of resources for receiving a second discovery signal by the UE. The first sequence of resources comprises at least one of a sequence of time instances and a sequence of power levels. The second sequence of resources comprises time instances.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

One of the used D2D techniques is discovery. The discovery technique includes the ability to discover neighboring user equipments (UEs). There are two types of discovery schemes that can be used: restricted (also called closed) discovery and open discovery. In open discovery, the UE attempts to discover other UEs or services, with only minimum guidance from the network or base station (e.g., eNB, communications controller). In the case of restricted discovery, the discovery is network or eNB assisted, with for example the eNB (or base station) directing one of the UEs to send a probing signal so that UE can be discovered. One of the problems associated with open discovery is that the number of UEs to be discovered can be large. Furthermore, in order to be effective, the discovery range has to be relatively large, e.g., on the order of several hundred meters. This means that the UE has to be able to receive a large number of signals, with potentially different power levels. This can create problems at the receiver, such as de-sensing the receiver or losing the capability to detect some signals due to the limited Analog-to-Digital Converter (ADC) dynamic range in the receiver.

Embodiments are provided herein to implement a time/power/frequency hopping scheme for D2D discovery. The embodiments improve the detection, by a UE, of D2D discovery signals from neighboring UEs and account for large number of UEs' discovery signals at a large discovery range. This is achieved by having neighboring UEs transmitting at different time instances and at different power levels. Further, neighboring UEs can be configured to transmit on different frequencies. This is achieved by assigning different time/power/frequency sequences to different UEs. An assigned sequence comprising non-contiguous allocations of a resource, e.g. time, power, or frequency resource, is also referred to herein as time, power, or frequency hopping. In an embodiment, parameters are sent, e.g., from a communication controller, to the UE. The parameters are then used by the UE to generate the sequences. The varying or hopped resource allocation (time/power/frequency hopping) in each sequence aims to increase the possibility of non-overlapping time/power/frequency resources among different UEs.

Figure 1:
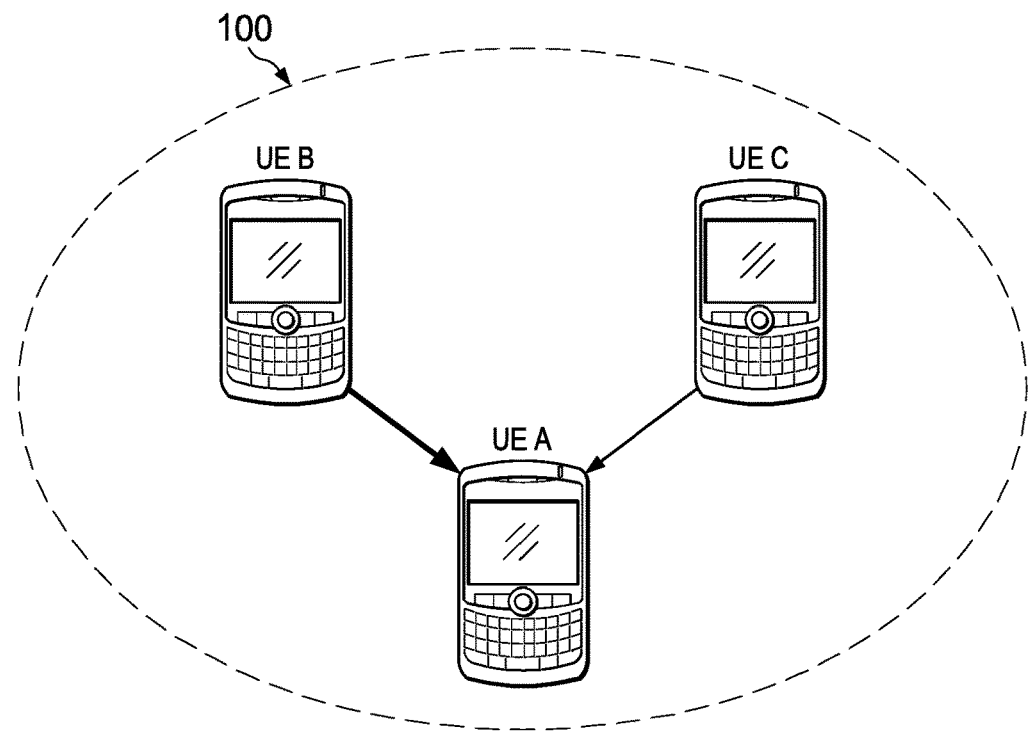
FIG. 1 illustrates a device-to-device (D2D) discovery scenario between UEs.

FIG. 1 shows a D2D discovery scenario 100 between UEs. A first UE (UE A) attempts to detect both a second UE (UE B) and a third UE (UE C), which each transmits a D2D discovery signal or frame. UE B is relatively close to UE A, and UE C is at a relatively large distance from UE A. As such, if UE B and UE C transmit their D2D discovery signals on the same resources and at the same power, then the signal from UE B may be received at UE A at a much stronger power level than the signal from UE C. This can cause two problems for the receiver of UE A, overloading and a masking effect. In overloading, the signal received from UE B saturates the radio frequency (RF) front end of the receiver of UE A, and thus the receiver is not able to detect any other signal (e.g., from UE C). In the masking effect, if UE B and UE C transmit at same frequencies and if the received signal powers from UE B and UE C are significantly different, then the ADC resolution at UE A may not be enough, and hence UE A may not be able to accurately detect the signal from UE C.

To resolve the issues above in scenario 100, the embodiments herein provide three different hopping mechanisms, time hopping, frequency hopping, and power hopping. Time hopping can be used to avoid having a transmitting UE (e.g., UE B) always overloads another receiving UE (e.g., UE A) or masks another transmitting UE (e.g., UE C). For instance time hopping can ensure that UE B would not always overload UE A or mask UE C. Power hopping can be used to ensure that a UE (e.g., UE B) does not necessarily flood a close-by UE's receiver (e.g., receiver at UE A) or mask another UE (e.g., UE C) by having it transmitting at a lower power. Frequency hopping can also be used to provide some frequency diversity in order to improve detection probability. These three hopping mechanisms should be uncorrelated to provide the aforementioned desired effects. The three hopping mechanisms can be used individually or in any combinations. However, using all three simultaneously may further improve system performance. The three hopping schemes are described in more detail below.

Figure 2:
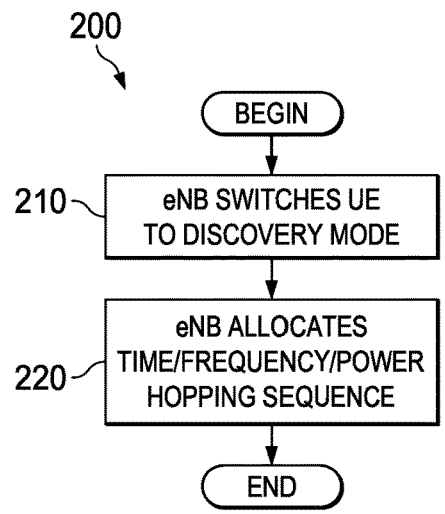
FIG. 2 illustrates an embodiment method of time/power/frequency hopping for D2D discovery.

FIG. 2 shows an embodiment method 200 of time/power/frequency hopping for D2D discovery. The method 200 is implemented by a network component, such as a base station (e.g., eNB) that manages the UEs' communications with the network. At step 210, the eNB, or any other type of suitable network access point or base station, instructs a UE to go into D2D discovery mode. The network can enable the D2D discovery functionality at a UE with discovery capability, for instance upon an application at the UE requesting discovery. This means that the UE transmits a signal that enables other UEs to detect it. This instruction may happen for various reasons, such as due to a request by the UE, or the eNB directing the UE to initiate Direct Mobile Communication (DMC). The instruction can be either explicit or implicit. For instance, an implicit instruction can be made by sending parameters of a pseudo-random hopping sequence to the UE. At step 220, the eNB assigns a hopping pattern for the UE. The hopping pattern comprises a time-hopping sequence, a frequency-hopping sequence, and/or a power-hopping sequence. The three sequences may be separate sequences or function or may be bundled as a single, three-dimensional hopping pattern. As an example, the bundled hopping sequence can be represented as $Z(t)=T(t) \times F(t) \times P(t)$, where "T", "F", and "P" represent time, frequency, and power level indices for discovery cycle "t". The discovery cycle is further described below. The hopping pattern or the individual hopping sequences assigned to a UE are intended to be non-overlapping or partially non-overlapping with other hopping patterns or sequences assigned to other UEs. However, the eNB may not specify all three hopping components. For instance, the power hopping sequence may not be needed or specified. It may be up to the UE to randomly or pseudo-randomly choose which power level to use, e.g. using a pseudo-random function generator. The signaling of hopping sequences to the UE may be explicit or implicit. The eNB may transmit the hopping sequences explicitly via signaling, such as using Radio Resource Control (RRC) signaling. In implicit signaling, the hopping sequences may be determined by the UE according to a UE identifier such as UE ID or D2D ID, a predefined function, and parameters provided by the eNB or the network, as described below. Using RRC signaling may be preferred since it reduces the probability of collisions, e.g., due to some overlapping sequences between different UEs. However, the UE is required to go into connected mode to receive the RRC signaling, and potentially the UE identifier (UE ID or D2D ID). Once this procedure is terminated, the UE may start operating in D2D discovery mode.

Time hopping can be used to avoid or reduce collision of discovery signal transmission of two specific UEs all the time. For instance, if UEs are allowed to transmit discovery signals in "n" (1≤n≤N) discovery subframes/time instances out of "N" available discovery subframes/time instances, time hopping may reduce the probability of two UEs colliding in all of their "n" discovery transmissions (n and N are integers and n≤N). This type of hopping is beneficial in reducing the masking/overloading probability of a UE by another UE. If a UE does not transmit in a discovery time instance, it can receive discovery signals of other UEs in that time instance.

The problem of overloading is not necessarily due to using the same frequency resource for two UEs (e.g., UE B and UE C), while masking occurs when UE B and UE C use the same combined time and frequency (time-frequency) resource. Therefore, in the hopping design, it is desired that the time-frequency resource for a UE is also hopped from subframe to subframe.

A UE transmits its discovery signal in discovery subframe number h(•) where "h" determines the "n" discovery subframe indices out of N available discovery subframes. The input arguments of "h" may include the UE's identifier such as D2D ID and parameters signaled by the network. For example, the network may determine an input argument of "h" based on the UE's Reference Signal Received Power (RSRP) reports.

As an example design, assuming N discovery subframes (time instances) within a discovery cycle, h can take values 0, . . . , N. The UE does not transmit its discovery signal in the cycle when its h=0. So, h can be written as h(i,t)=$f$(i, t)×g(i,t). The parameter "i" represents a parameter that can be chosen randomly or can be tied to a UE identifier (such as D2D ID, etc.), or can be configured by the network, or a combination of the mentioned approaches. The parameter "t" is the discovery cycle index. Function "$f$" determines the subframe number inside the discovery cycle index "t", and it takes values 1, . . . , N. Function "g" may be set to "0" or "1", which determines whether the UE is allowed to transmit the discovery signal in discovery cycle "t" or not, respectively.

An example design for "$f$" can be $f(i,t)=\mod(i\times(t+n_c)^m+n_r, p)$, where parameters m and p, where $0 \leq m$ and $0 < p \leq N$, are determined by the network, and $0 \leq n_c$, $n_r \leq p-1$ can be selected using a similar approach as selecting "i". One example of such a design could be m=2, p=Prime(N), where Prime(N) gives the closest prime number equal or smaller than N. An example design for "g" can be a pseudo random generator generating random permutation of integers 1 to N, and selecting the first "n" of them ("n" signaled by the network). The output of function "g" for the selected "n" discovery subframes may be "1", and for other discovery subframes may be "0". The seed to the pseudo random generator can be a function of "i" (e.g., "i" itself). Another example of "g" could be a random number generator whose output is between 0 and 1. The network can assign a threshold such that a value above the threshold implies transmission while a value below the threshold implies no transmission.

Each discovery cycle is composed of a group of subframes (not necessarily contiguous) allocated to discovery, and discovery cycles may happen infrequently. For instance, each discovery cycle might be composed of 20 discovery subframes and there might be a discovery cycle every second. In another embodiment, a time hopping scheme allows UEs to transmit multiple times within a discovery cycle according to a probability rule.

An example probability rule can be each UE transmits a discovery signal in each discovery cycle in two discovery subframes/instances with probability "$p_2$", in one discovery subframe/instance with probability "$p_1$", and in zero discovery subframe/instance with probability "$p_0$", where "$p_2+p_1+p_0=1$". In an example, $p_2=p_0=0.05$. This is a sample design and it might be possible to allow a UE to have up to "K" discovery transmissions in a discovery cycle, $\Sigma_{k=0}^{K} p_k=1$. The probability rule can be different from a discovery cycle to another. For instance, at first "C" discovery cycles, parameters can take the following values $p_1=1$, $p_2=p_0=0$, and afterwards the values $p_1=0.5$, $p_2=p_0=0.25$ are used. The parameter "C" (number of first discovery cycles) and the probability rules can be signaled to UEs, e.g., by a broadcast message from the network.

A similar method may be used to assign resources for the UE to receive a discovery signal from another UE. The method includes sending the UE parameters indicating (e.g., used by the UE to generate) a hopping pattern of resources (e.g., time, power, and/or frequency resources) for receiving the discovery signal from other UEs.

Figure 3:
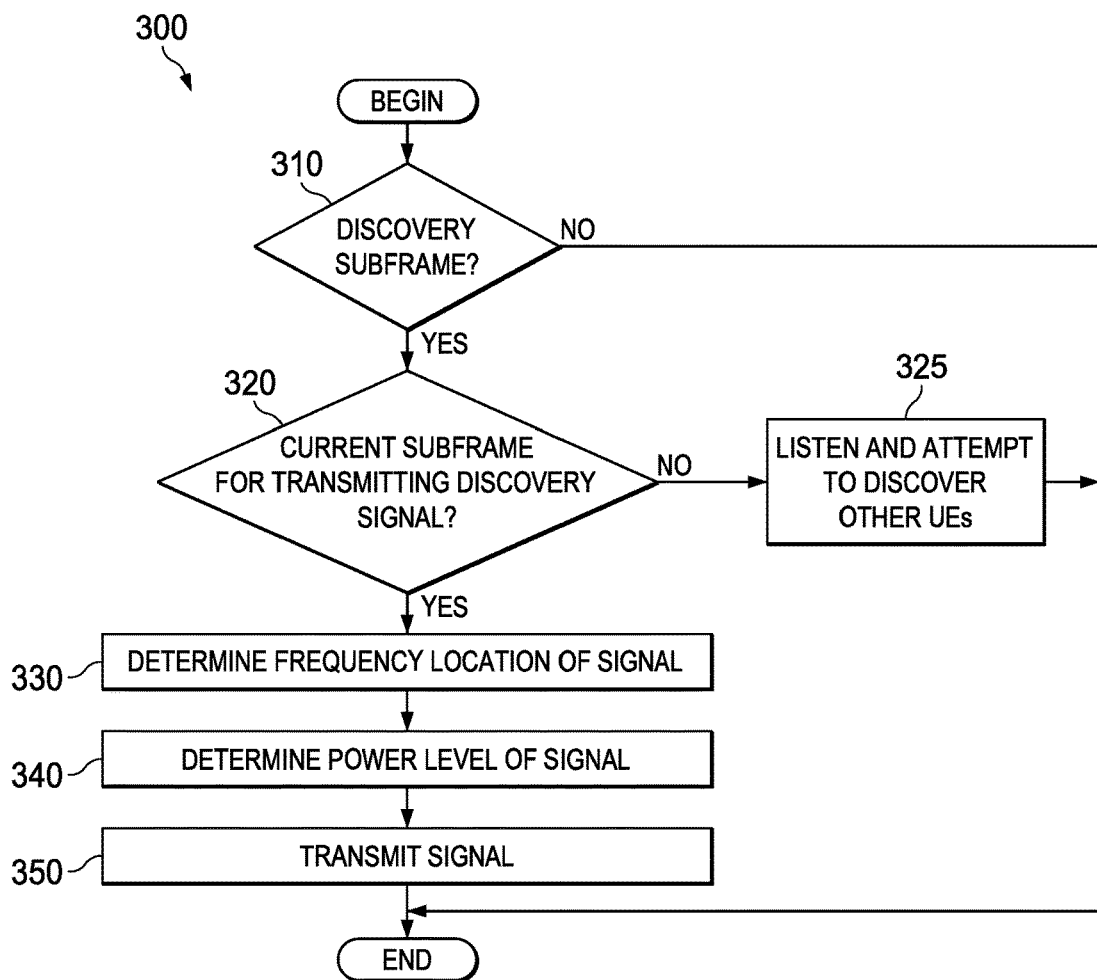
FIG. 3 illustrates an embodiment method of UE operation for discovery mode.

FIG. 3 shows an embodiment method 300 of UE operation for discovery mode. At step 310, the UE assesses if the current subframe is a subframe where the discovery procedure is to take place. If this is not true "N", then no discovery attempt is made, and the UE processes the subframe as usual. If the condition in step 310 is true "Y", then at step 320, the UE uses the time hopping sequence to determine if it has to transmit its discovery sequence. If this is not true "N", then at step 325, the UE, if configured, listens and attempts to discover other UEs. If the condition in step 320 is true "Y", then at step 330, the UE uses the frequency hopping sequence to determine which resource block(s) (RB(s)) to use. At step 340, the UE uses the power hopping sequence to determine which power level to use. Alternatively, the UE may pseudo randomly choose one power level on its own. The power levels may include zero power indicating no transmission. The parameter(s) of such a pseudo-random generator, including set of power levels and power level selection probability, can be signaled by the network, and can be different from a discovery cycle to another. As an example, the probability of selecting a power level for UEs in an area (e.g., a cell) can be based on the density of the UEs in that area. At step 350, the UE transmits the discovery signal at the frequency location with the chosen transmit power. One mode of frequency hopping may be to define a block of "m" resources, which may be contiguous or non-contiguous. The UE randomly chooses "n" resources out of the block to transmit.

Figure 4:
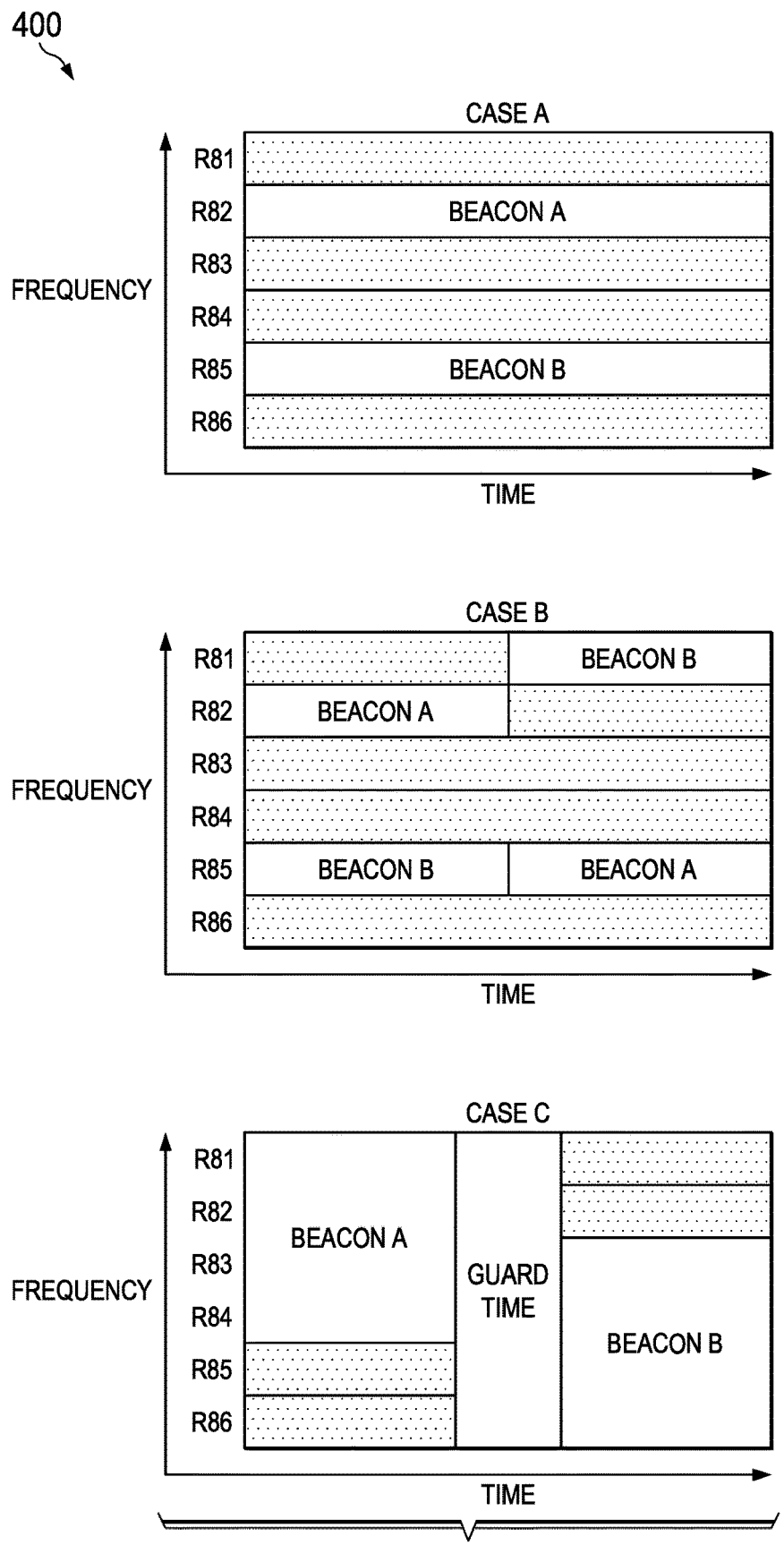
FIG. 4 illustrates possible formats of transmitted discovery signals.

FIG. 4 shows embodiments of possible formats 400 for transmitted discovery signals. A time-frequency format of discovery transmissions can be signaled to UEs by the network. For example, the time-frequency format can be 12 subcarriers×12 Orthogonal Frequency Division Multiplexing (OFDM) symbols. Typically, there are 14 OFDM symbols in a 1 ms subframe. With 12 symbols in this format, the first and last OFDM symbols of a 1 ms subframe can be reserved as a guard time between transmit and receive mode for the UE. In an implementation, RRC signaling can be used to signal the time-frequency format for connected (active) UEs, while System Information Block (SIB) or broadcast/paging may be used for idle UEs. A time-frequency format can be selected from a plurality of predefined time-frequency formats. The time-frequency format can be different depending on the subframe number within a radio frame. For instance, in case of TDD systems, the time-frequency formats of the discovery resources happening in an UL subframe and in a special subframe can be different.

In case A, the discovery signal format occupies a full physical resource block (PRB) pair. For example, the full PRB pair includes 12 subcarriers×12 OFDM symbols, which can be used to optimize discovery range when the density of devices is relatively low. In another example, when the density of devices is relatively high, 72 subcarriers×2 OFDM symbols can be used to minimize near-UE-far-UE blocking at the receiver. Other possible configurations may be 48 subcarrier×3 OFDM symbols, 36 subcarriers×4 OFDM symbols, or 144 subcarriers×1 OFDM symbols. The network or eNB can select the width both in time and frequency for the discovery signal according to various parameters, such as density of UEs and range for discovery. In case B, the discovery signal format occupies two slots in different resource blocks (RBs), where each slot comprises half of the OFDM symbols available in an RB. This allows more frequency diversity for each UE. In case C, a discovery signal occupies multiple contiguous RBs or multiple contiguous portions of RBs. A guard time is also inserted between different discovery signals.

In yet another configuration (not shown), the resources (RBs or portions of RBs) for each discovery signal are not necessarily contiguous. In another example, a discovery signal for a UE occupies one of the OFDM symbols. In this case, the guard time for the UE is aligned with the symbols next to the discovery signal. During the guard time, the UE does not listen, but other UEs may still transmit. In yet another configuration, a discovery signal may be sent over multiple contiguous or non-contiguous subframes, e.g., to provide even more flexibility in the time/frequency location and width and/or to have a larger discovery range.

In an embodiment, the eNB or base station can implement a procedure to modify the discovery signal time/frequency width or format. The eNB can indicate the new discovery format in a SIB message. The eNB may also include a time indication of when to start the new discovery format, e.g., to avoid a timing ambiguity where two different signal formats are used. It is expected that all UEs use the new discovery format at the time indicated by the time indication. The UE is configured to listen to the SIB message, at least once per a given time interval. When the UE decodes the SIB message, the UE gets the new format and the time indication. At the time indicated by the time indication, the UE switches to the new discovery format.

Figure 5:
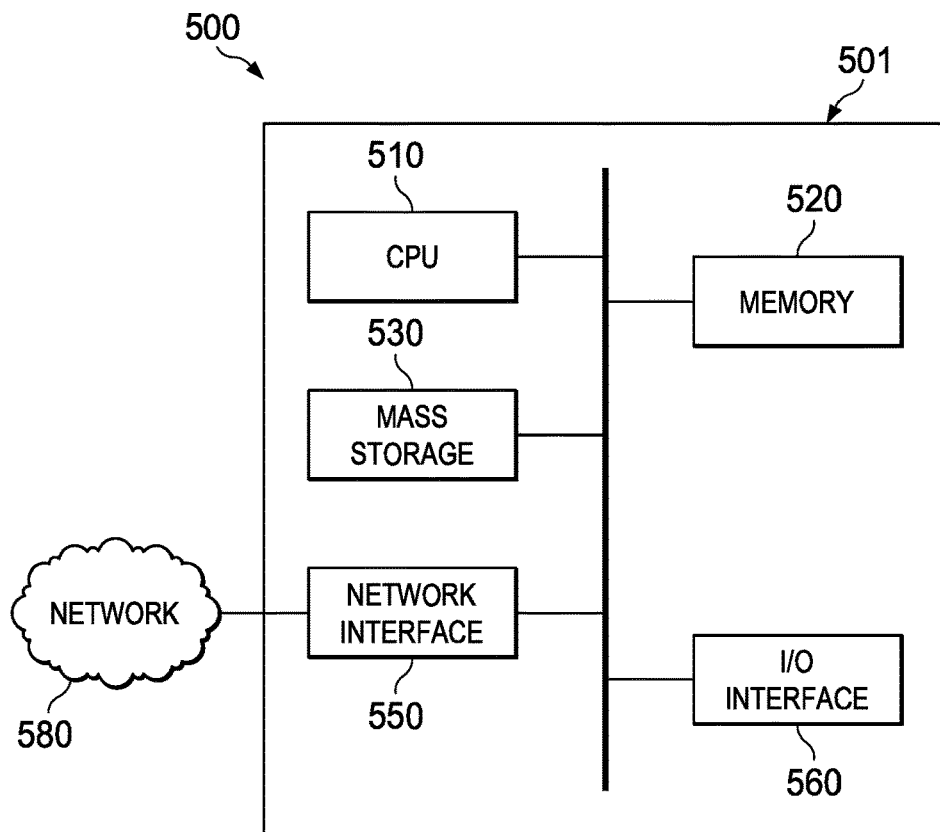
FIG. 5 is a diagram of a processing system that can be used to implement various embodiments.

FIG. 5 is a block diagram of an exemplary processing system 500 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 500 may comprise a processing unit 501 equipped with one or more input/output devices, such as a network interfaces, storage interfaces, and the like. The processing unit 501 may include a central processing unit (CPU) 510, a memory 520, a mass storage device 530, and an I/O interface 560 connected to a bus. The bus may be one or more of any type of several bus architectures including a memory bus or memory controller, a peripheral bus or the like.

The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs. In embodiments, the memory 520 is non-transitory. The mass storage device 530 may comprise any type of storage device configured to store data, programs, and other information and to make the data, programs, and other information accessible via the bus. The mass storage device 530 may comprise, for example, one or more of a solid state drive, hard disk drive, a magnetic disk drive, an optical disk drive, or the like.

The processing unit 501 also includes one or more network interfaces 550, which may comprise wired links, such as an Ethernet cable or the like, and/or wireless links to access nodes or one or more networks 580. The network interface 550 allows the processing unit 501 to communicate with remote units via the networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method comprising:
   receiving, by a first user equipment (UE) from a base station, an indication indicating a threshold for comparing values from a random number generator for transmitting device-to-device (D2D) discovery signals using a pool of discovery resources during a discovery cycle, wherein the pool of discovery resources in the discovery cycle includes N subframes, wherein N is an integer greater than or equal to 2;
   generating, by the first UE, N random numbers corresponding to the N subframes from the random number generator;
   determining, by the first UE, which subframes of the N subframes are used for transmitting the D2D discovery signals based on the N random numbers and the threshold; and
   transmitting, by the first UE, a D2D discovery signal to a second UE in accordance to the determining.

2. The method of claim 1, further comprising receiving, by the first UE, an indication of a length of the discovery cycle.

3. The method of claim 1, wherein the D2D discovery signal is transmitted over at least one resource block in a set of resource blocks, and wherein the first UE is unable to receive D2D discovery signals from another UE over the set of resource blocks during a time interval in which the first UE transmits the using the pool of discovery resources during the discovery cycle.

4. The method of claim 1, wherein the base station is an eNB.

5. The method of claim 1, wherein the pool of discovery resources includes time domain resources.

6. The method of claim 1, wherein the pool of discovery resources includes frequency domain resources.

7. The method of claim 1, wherein the pool of discovery resources is associated with transmit power levels for transmitting the D2D discovery signal during the discovery cycle.

8. The method of claim 1, wherein the indication further indicates a probability for transmitting the D2D discovery signals using the pool of discovery resources during the discovery cycle selected from a set of probabilities comprising 0.25, 0.5, and 1.

9. A first user equipment (UE) comprising:
   at least one processor; and
   a non-transitory computer readable storage medium storing programming for execution by the at least one processor, the programming including instructions to cause the first UE to:
      receive, from a base station, an indication indicating a threshold for comparing values from a random number generator for transmitting device-to-device (D2D) discovery signals using a pool of discovery resources during a discovery cycle, wherein the pool of discovery resources in the discovery cycle includes N subframes, wherein N is an integer greater than or equal to 2;
      generate N random numbers corresponding to the N subframes from the random number generator;
      determine which subframes of the N subframes are used for transmitting the D2D discovery signals based on the N random numbers and the threshold; and
      transmit a D2D discovery signal to a second UE in accordance of which subframes are used for transmitting the D2D discovery signals.

10. The first UE of claim 9, wherein the programming further includes instructions cause the first UE to receive an indication of a length of the discovery cycle.

11. The first UE of claim 9, wherein the D2D discovery signal is transmitted over at least one resource block in a set of resource blocks, and wherein the first UE is unable to receive D2D discovery signals from another UE over the set of resource blocks during a time interval in which the first UE transmits the using the pool of discovery resources during the discovery cycle.

12. The first UE of claim 9, wherein the base station is an eNB.

13. The first UE of claim 9, wherein the pool of discovery resources includes time domain resources.

14. The first UE of claim 9, wherein the pool of discovery resources includes frequency domain resources.

15. The first UE of claim 9, wherein the pool of discovery resources is associated with transmit power levels for transmitting the D2D discovery signal during the discovery cycle.

16. A non-transitory computer readable storage medium storing instructions, that when executed by a first user equipment (UE), cause the first UE to:
   receive, from a base station, an indication indicating a threshold for comparing values from a random number generator for transmitting device-to-device (D2D) discovery signals using a pool of discovery resources during a discovery cycle, wherein the pool of discovery resources in the discovery cycle includes N subframes, wherein N is an integer greater than or equal to 2;
   generate N random numbers corresponding to the N subframes from the random number generator;
   determine which subframes of the N subframes are used for transmitting the D2D discovery signals based on the N random numbers and the threshold; and
   transmit a D2D discovery signal to a second UE in accordance to determination of which subframes are used for transmitting the D2D discovery signals.

17. The non-transitory computer readable storage medium of claim 16, wherein the pool of discovery resources includes time domain resources.

18. The non-transitory computer readable storage medium of claim 16, wherein the pool of discovery resources includes frequency domain resources.

19. The non-transitory computer readable storage medium of claim 16, wherein the pool of discovery resources is associated with transmit power levels for transmitting the D2D discovery signal during the discovery cycle.

20. A method comprising:
   receiving, by a first user equipment (UE) from a base station, an indication indicating a probability for transmitting device-to-device (D2D) discovery signals using a pool of discovery resources during a discovery cycle;
   identifying, by the first UE based on the indication, the probability for transmitting the D2D discovery signals using the pool of discovery resources during the discovery cycle, wherein the probability for transmitting the D2D discovery signals using the pool of discovery resources during the discovery cycle is selected from a set of probabilities comprising 0.25, 0.5, and 1; and
   transmitting, by the first UE, a D2D discovery signal to a second UE during the discovery cycle based on the probability for transmitting the discovery signals using the pool of discovery resources during the discovery cycle.

* * * * *